United States Patent
Bowles et al.

(10) Patent No.: US 9,522,591 B1
(45) Date of Patent: Dec. 20, 2016

(54) SEALING ARRANGEMENT FOR A VEHICLE TOP SURFACE ELEMENT

(71) Applicant: Webasto-Edscha Cabrio GmbH, Stockdorf (DE)

(72) Inventors: Jason Bowles, Owosso, MI (US); Philipp Wolf, Stockdorf (DE); Ryan Mitchell, Detroit, MI (US)

(73) Assignee: WEBASTO-EDSCHA CABRIO GMBH, Stockdorf (DE)

( * ) Notice: Subject to any disclaimer, the term of this patent is extended or adjusted under 35 U.S.C. 154(b) by 0 days.

(21) Appl. No.: 14/820,214

(22) Filed: Aug. 6, 2015

(51) Int. Cl.
*B60J 7/04* (2006.01)
*B60J 7/12* (2006.01)

(52) U.S. Cl.
CPC .............. *B60J 10/90* (2016.02); *B60J 7/1226* (2013.01)

(58) Field of Classification Search
CPC ....... B60J 10/04; B60J 10/047; B60J 10/1226; B60J 10/1265; B60J 10/14; B60J 10/143; B60J 10/90
See application file for complete search history.

(56) References Cited

U.S. PATENT DOCUMENTS

| | | | | |
|---|---|---|---|---|
| 2,861,836 A * | 11/1958 | Goeggel | ............ | B60J 7/047 160/193 |
| 4,850,634 A * | 7/1989 | Taubitz | ............ | B60J 7/1265 296/107.09 |
| 5,018,784 A * | 5/1991 | Yokouchi | ............ | B60J 7/047 296/219 |
| 6,435,606 B1 | 8/2002 | Miklosi et al. | | |
| 6,685,252 B2 * | 2/2004 | Graf | ............ | B60J 10/25 296/108 |
| 7,114,769 B2 * | 10/2006 | Storc | ............ | B60J 1/183 280/749 |
| 7,464,987 B2 * | 12/2008 | Richter | ............ | B60J 7/0084 296/213 |
| 7,607,715 B2 * | 10/2009 | Beierl | ............ | B60J 7/1265 296/107.15 |
| 8,056,956 B2 * | 11/2011 | Heselhaus | ............ | B60J 7/0435 296/107.15 |
| 9,108,493 B2 * | 8/2015 | Haimerl | ............ | B60J 7/061 |
| 9,108,494 B2 * | 8/2015 | Haimerl | ............ | B60J 7/1265 |
| 9,114,690 B1 * | 8/2015 | Bowles | ............ | B60R 21/13 |

(Continued)

FOREIGN PATENT DOCUMENTS

| | | | | |
|---|---|---|---|---|
| DE | 4015989 A1 * | 11/1990 | ............ | B60J 7/1265 |
| DE | 4203228 A1 * | 8/1993 | ............ | B60J 1/14 |

(Continued)

*Primary Examiner* — Glenn Dayoan
*Assistant Examiner* — Paul Chenevert
(74) *Attorney, Agent, or Firm* — Fitch, Even, Tabin & Flannery LLP

(57) ABSTRACT

A vehicle construction, having a displaceable top which includes a linkage that, on each of its two sides, in relation to a vertical longitudinal center plane of the top, and can have one link arrangement, the link arrangement being pivotably mounted at a main bearing that is fixed relative to the vehicle. In a closed position of the top, a top surface element abuts against a component part that is fixed relative to the vehicle via a sealing arrangement, wherein the sealing arrangement is arranged at a sealing carrier unit, which can be pivoted with respect to the component part that is fixed relative to the vehicle and with respect to the top surface element.

10 Claims, 19 Drawing Sheets

(56) References Cited

U.S. PATENT DOCUMENTS

| | | | |
|---|---|---|---|
| 9,283,833 B2 * | 3/2016 | Kopp | B60J 7/061 |
| 2006/0273618 A1 * | 12/2006 | Queveau | B60J 7/145 |
| | | | 296/108 |
| 2008/0073940 A1 * | 3/2008 | Bunsmann | B60J 7/04 |
| | | | 296/203.03 |
| 2012/0161464 A1 * | 6/2012 | Katrini | B60J 7/1226 |
| | | | 296/107.12 |
| 2015/0246605 A1 * | 9/2015 | Kleinhoffer | B60J 10/24 |
| | | | 296/216.06 |
| 2016/0167496 A1 * | 6/2016 | Sviberg | B60J 7/1204 |
| | | | 296/107.07 |

FOREIGN PATENT DOCUMENTS

| | | | | |
|---|---|---|---|---|
| DE | 199 39 724 C1 | | 2/2001 | |
| DE | 10320538 A1 | * | 12/2004 | B60J 7/04 |
| DE | EP 1555152 A2 | * | 7/2005 | B60J 7/1226 |
| DE | 102013203873 A1 | * | 9/2014 | B60J 10/77 |
| FR | EP 0989009 A1 | * | 3/2000 | B60J 1/1823 |
| FR | 2865162 | * | 7/2005 | B60J 1/1823 |
| FR | 2913373 A1 | * | 9/2008 | B60J 7/04 |
| FR | 2964065 A1 | * | 3/2012 | B60J 1/1823 |
| FR | 3012083 A1 | * | 4/2015 | B60J 7/04 |
| GB | 201652 A | * | 8/1923 | B60J 7/047 |
| GB | 644969 A | * | 10/1950 | B60J 7/1252 |

* cited by examiner

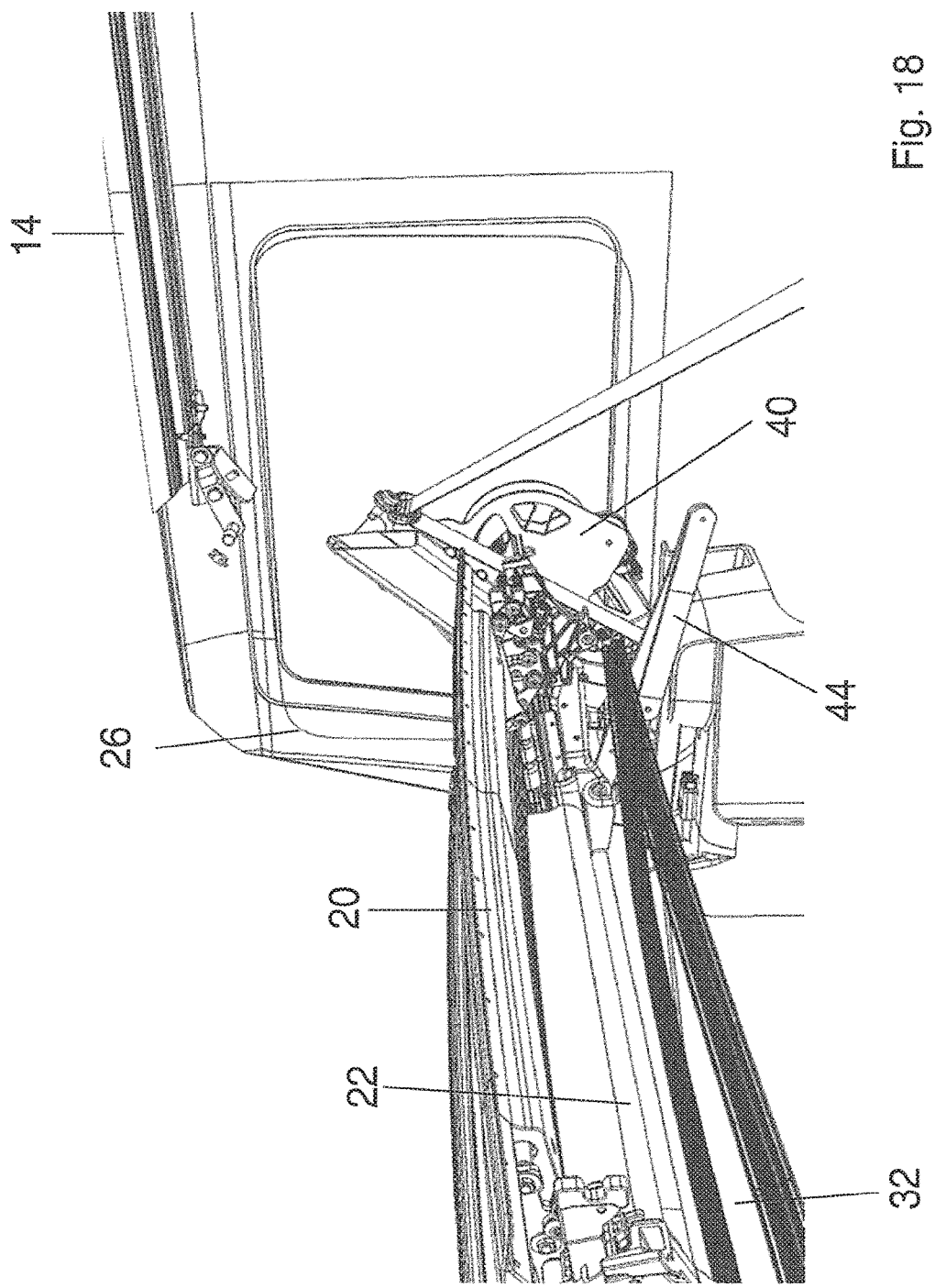

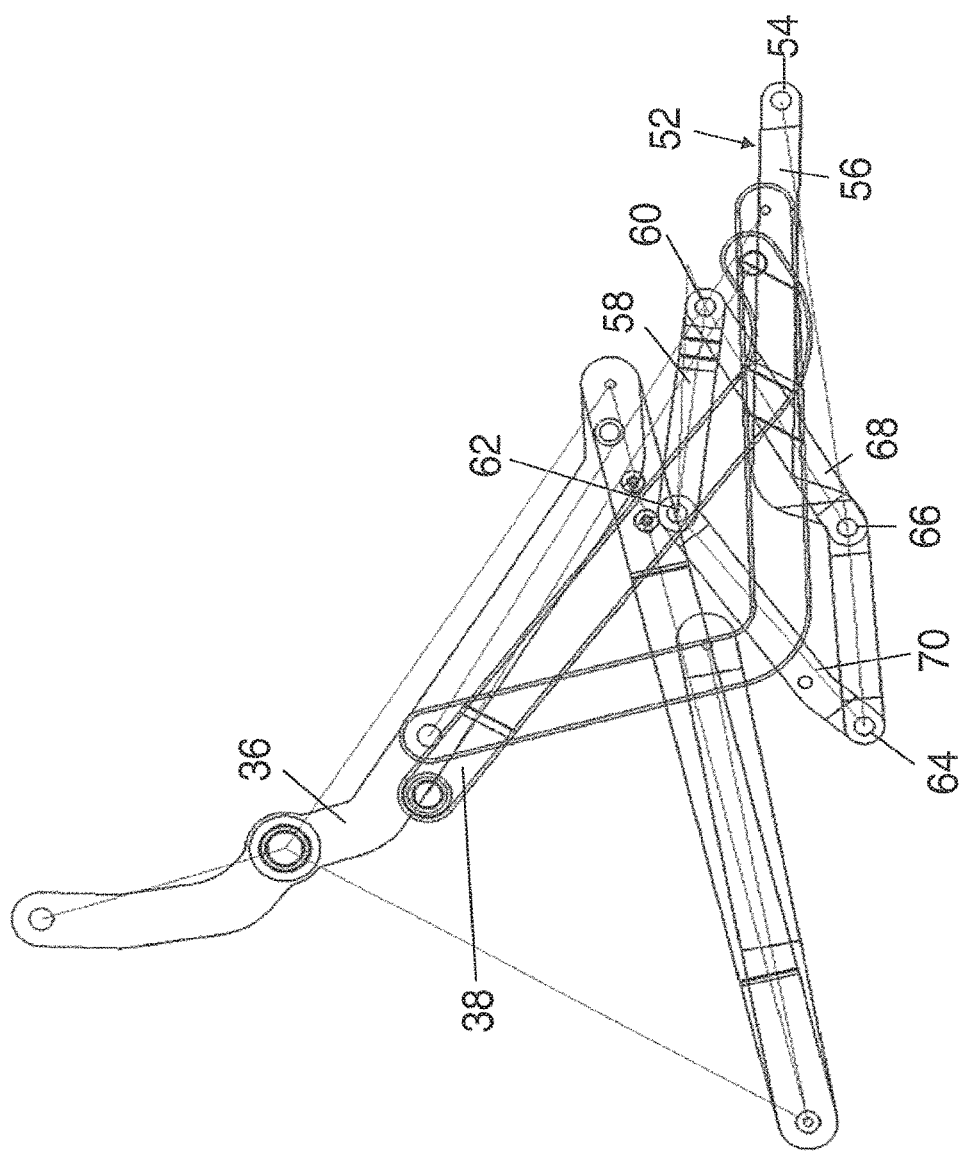

SEALING ARRANGEMENT FOR A VEHICLE TOP SURFACE ELEMENT

FIELD

Vehicle constructions are described herein having a top which is displaceable between a closed position spanning a vehicle interior and a storage position for uncovering the vehicle interior to the top, and in particular to sealing arrangements for a top surface element of a vehicle construction.

BACKGROUND

A vehicle construction having a top which is displaceable between a closed position spanning a vehicle interior and a storage position for uncovering the vehicle interior to the top is, for example, known from document DE 199 39 724 C1 (U.S. Pat. No. 6,435,606 B1). The top can have a folding roof portion, which, in the closed position of the top, is limited by a top cassette in the rear and which can be unfolded or advanced as far as to a front apron of the vehicle for spanning the vehicle interior. For being displaced into the uncovered position or storage position, the folding roof portion is accommodated by the top cassette, which can then be stored in a rear storage space of the vehicle construction using a linkage. In the closed position of the top, a rear window of the relevant vehicle is arranged below the top cassette, the rear window being surrounded by a foldable top fabric, which is guided as far as to lateral pillars of the vehicle construction. In order to prevent moisture from entering the vehicle interior in the region of the transition between the fabric and the pillars, the fabric abuts against a sealing arrangement. The top has to be designed such that the sealing arrangement lies outside of the movement path of the roof cassette when the roof cassette is lowered. Therefore, the roof cassette and the folding roof portion can only have a limited width.

SUMMARY

It is the object of the present embodiments to create a vehicle construction having a top which includes a rear top cassette whose width is not limited by a sealing arrangement.

According to one approach, a vehicle construction is therefore proposed that comprises a top which is displaceable between a closed position spanning a vehicle interior and a storage position for uncovering the vehicle interior to the top and which includes a linkage that, on each of its two sides, in relation to a vertical longitudinal center plane of the top, comprises one link arrangement, the link arrangement being pivotably mounted at a main bearing that is fixed relative to the vehicle. In the closed position of the top, a top surface element abuts against a component part that is fixed relative to the vehicle via a sealing arrangement. The sealing arrangement is arranged at a sealing carrier unit, which can be pivoted with respect to the component part that is fixed relative to the vehicle and with respect to the top surface element.

This means that it is possible with the proposed vehicle construction to pivot the sealing arrangement in the course of the displacement procedure such that the movement of other top elements is not disturbed by the sealing arrangement itself. The movement path of the sealing carrier unit or the pivoting characteristics thereof can be designed in the style of the design of the relevant top and of the relevant vehicle construction.

The top surface element is, for example, a foldable top fabric, which abuts, via the sealing arrangement, against a lateral pillar, in particular against the so-called C-pillar or against the so-called D-pillar of the vehicle construction in the unfolded state that means in the closed position of the top. It is able to accommodate a rear window of the vehicle construction.

The term "component part that is fixed relative to the vehicle" should be understood in the broadest sense and thus can have elements that are rigidly arranged at the vehicle construction and also rigid vehicle component parts, which are mounted at the vehicle body so as to be movable or are fixed to the same so as to be detachable. The component part, which is fixed relative to the vehicle, and against which the sealing arrangement abuts in the closed position of the top, may be a panel, which forms a vehicle side surface and is, for example, part of a C-pillar or D-pillar of the vehicle construction.

In a special embodiment of the vehicle construction, the sealing arrangement includes at least two sealing elements, which are aligned with one another in a sealing position and which can be pivoted with respect to one another. This means that the sealing arrangement can be divided and is subdivided, when the top is being displaced, using the sealing carrier unit that can be pivoted, into two portions that are separate from each other. In the sealing position, the two sealing elements form a continuous sealing arrangement, in particular also a continuous sealing profile.

In accordance with a further aspect, the sealing carrier unit may have a four-arm hinge arrangement, which includes two carrier links, one of the sealing elements being arranged thereon in each instance.

The sealing carrier unit, which is preferably provided with a drive apparatus, such as an electric motor or a hydraulic drive, can, in accordance with a further aspect, be pivotably mounted at a basis that is fixed relative to the vehicle. The basis that is fixed relative to the vehicle is in particular arranged in the region of a rear top storage space of the relevant vehicle construction.

In another approach, the top can have a rear top cassette or roof cassette, which forms a rear roof region in the closed position of the top and can be lowered, using the linkage, into the storage position for displacing the top. In particular in this case, by pivoting the sealing arrangement using the pivotably mounted sealing carrier unit, the movement path for the top cassette can be unblocked. This means that the sealing arrangement, for displacing the top cassette, is pivoted out of the movement track thereof.

In accordance with a further approach, a folding roof portion of the top may be arranged at the top cassette, the folding roof portion, in its closed position, forming the actual roof of the vehicle construction and being accommodated, when the top cassette is being lowered, by the same.

Further advantages and advantageous configurations of the described embodiments can be taken from the description, from the drawing and from the claims.

BRIEF DESCRIPTION OF THE DRAWINGS

FIG. 18 shows an inside view of the construction corresponding to FIG. 8 when the top cassette is stored.

FIG. 19 shows a view of the link arrangement corresponding to FIG. 9 when the top cassette is stored.

DETAILED DESCRIPTION

Figure 1:
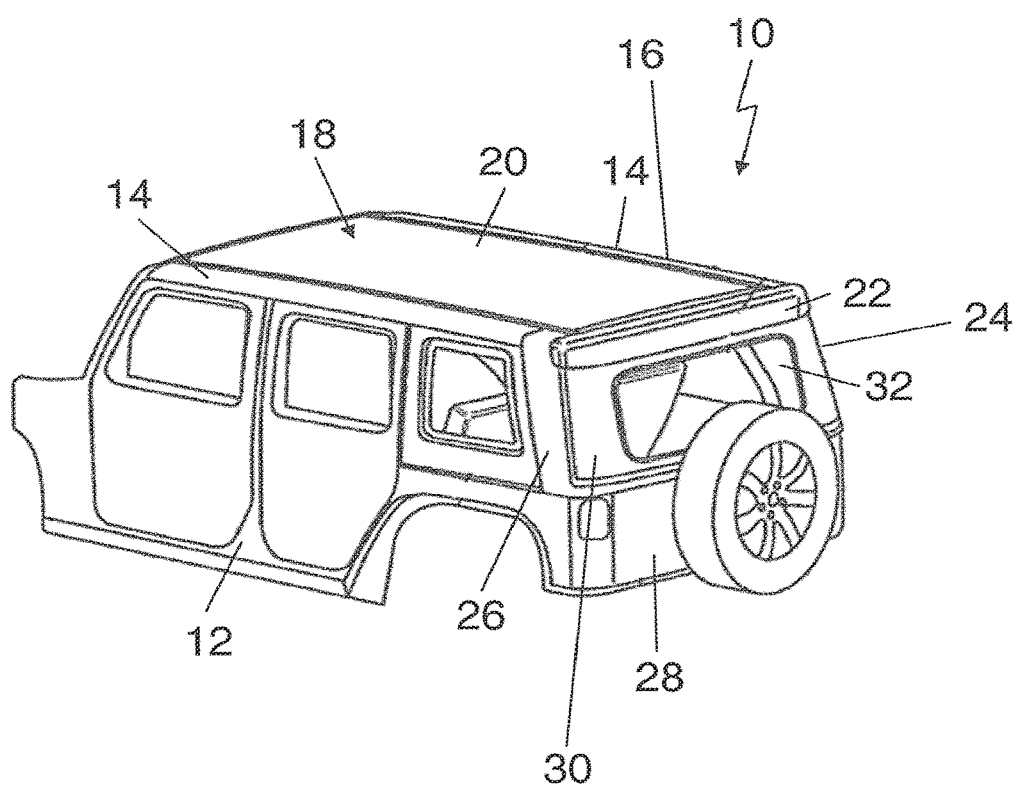
FIG. 1 shows a vehicle construction having a displaceable top in the closed position thereof.

In the drawing, a vehicle construction 10 is illustrated, which is part of a passenger car that is designed as an off-road vehicle. The vehicle construction 10 can have a body 12, which is provided with one longitudinal roof beam 14 on each of its two sides in relation to a vertical longitudinal center plane of the vehicle. Between the two longitudinal roof beams 14, a roof opening 16 is realized, which can be closed in the manner being illustrated in FIG. 1 using a top 18.

The top 18 is displaceable between a closed position spanning a vehicle interior and a storage position for uncovering the vehicle interior to the top and can have a folding roof portion 20, which, in the closed position of the top, is spanned between the two longitudinal roof beams 14. In the rear, the folding roof portion 20 is limited by a top cassette 22, which forms a rear corner region of the top 18 and merges into a rear top portion 24, which is on each of its two sides limited by a D-pillar of the vehicle construction and by a tailgate 28 in the bottom. The rear top portion 24 can have a foldable top fabric or top cut 30, which forms a top surface element in the closed position of the top 18 being illustrated in FIG. 1 and which accommodates a rigid rear window 32 of the vehicle construction.

The folding roof portion 20 is provided with an actuating mechanism whose drive is accommodated by the top cassette 22. As it can be taken from a combined view of FIGS. 1 and 2, the folding roof portion 20 is guided in the lateral longitudinal roof beams 14 when it is being displaced and is accommodated by the top cassette 22 in its open position.

As it can further be taken from the drawing, the top 18, in the broadest sense, is realized as a folding top, wherein the folding roof portion 20 forms the actual vehicle roof in the closed position. The top cassette 22, which accommodates the displacing mechanism for the folding roof portion 20 and forms the rear corner region of the vehicle roof in the closed position, is lowered into a rear top storage space of the vehicle construction 10 together with the retracted folding roof portion 20 when the top 18 is being displaced from the closed position being illustrated in FIG. 1 into the storage position being illustrated in FIGS. 15 to 19.

The top 18 being described in the present documents is realized so as to be at least largely mirror-symmetrical relating to the vertical longitudinal center plane of the vehicle. For reasons of clarity, the following description is therefore only made on the basis of the regions of the top that are arranged on the left in relation to the forward direction of travel of the relevant vehicle. The regions of the top that are arranged on the right in relation to the forward direction of travel are realized correspondingly and therefore also follow inevitably.

For displacing the top cassette 22 between the operating position being illustrated in FIGS. 1 to 8 and the lowered position being illustrated in FIGS. 15 to 18, the top 18 includes, in relation to the vertical longitudinal center plane of the top, one linkage arrangement 34 on each of its two sides, which can have two main links 36 and 38, which are pivotably mounted at a main bearing 40 that is fixed relative to the vehicle. With their ends facing away from the respective main bearing 40, the main links 36 and 38 are articulated to the top cassette 22. The main bearings 40 are in each instance mounted to a roll bar extending in the longitudinal vehicle direction, which roll bar is part of a roll cage pertaining to the vehicle construction and not being illustrated in more detail.

The rear window 32 can be pivoted for displacing the top cassette 22 and is connected to rear window links 42 and 44 of the respective linkage arrangement 34 hereunto, which links can be driven using a main drive 46 being attached to the main bearing 40, and also driving the main links 36 and 38. The main drive 46 can be an electric motor or a hydraulic drive.

In order to be able to seal, in the closed position of the top, a transition between the fabric cut 30 of the rear top portion 24 and the D-pillars 26, the top 18 includes a sealing arrangement 48, which can have a sealing profile 50, which is realized as a double hollow profile and, on the one hand, abuts against a blind of the D-pillar 26 from the inside, and, on the other hand, against the fabric cut 30 from the inside. Consequently, the fabric cut 30 constituting a top surface element, via the sealing arrangement 48, abuts against the D-pillar 26, which forms a component part that is fixed relative to the vehicle.

The sealing arrangement 48 can have a sealing carrier unit 52, which is pivotably mounted in a hinge point 54 that is fixed relative to the body, i.e. at a basis that is fixed relative to the vehicle. The sealing carrier unit 52 can have two carrier links 56 and 58, which are connected in hinge points 60, 62, 64 and 66 to two control links 68 and 70, in this way forming a four-arm hinge arrangement together with the control links 68 and 70. The control links 68 and 70 define, upon an actuation of the four-arm hinge arrangement, the relative movement of the two carrier links 56 and 58 with respect to each other.

The sealing carrier unit 52 can be pivoted with respect to the vehicle construction using a drive 72 only being illustrated in a strongly schematized fashion in the drawing. The four-arm hinge arrangement can be actuated using a drive 74, for example being designed as a linear drive, the drive for example acting on the control link 68 and on the carrier link 56, such that it is possible to store the sealing carrier unit 52 in the top storage space of the vehicle construction 10 in a space-saving fashion.

A first sealing element 76 of the sealing profile 50 is attached on carrier link 56, whereas a second sealing element 78 of the sealing profile 50 is attached on carrier link 58. In the sealing position being illustrated in FIG. 4, the two sealing elements 76 and 78 are aligned with each other.

When displacing the sealing carrier unit 52, on the one hand, the sealing carrier unit 52 is pivoted with respect to the vehicle construction in the direction of the vehicle interior and, on the other hand, sealing element 76 is pivoted with respect to sealing element 78 by actuating the four-arm hinge arrangement of the sealing carrier unit 52. Thereby, the two sealing elements 76 and 78 can be arranged one above the other in the storage position of the sealing carrier unit 52, in each instance extending in the longitudinal vehicle direction (cf. FIG. 16).

Actuating the sealing carrier unit 52, that means storing it in the fashion previously described, makes problem-free storing of the top cassette 22 in the top storage space possible. This means that the sealing arrangement 48 is pivoted out of the movement path of the top cassette 22 by actuating the sealing carrier unit 52.

Figure 2:
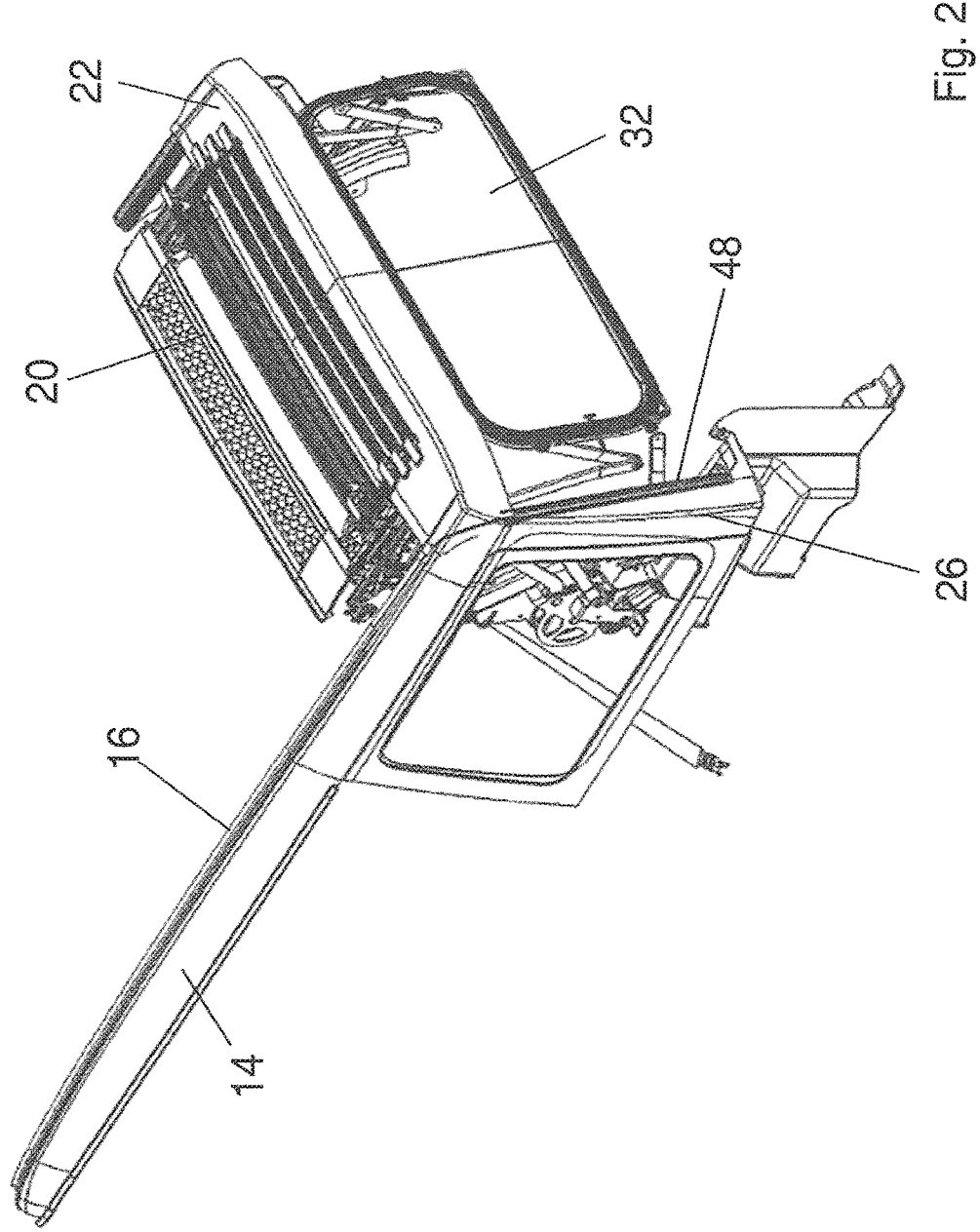
FIG. 2 shows a perspective illustration of the top together with a lateral roof beam and with a D-pillar of the vehicle construction, with a folding roof portion in the open position.
Figure 3:
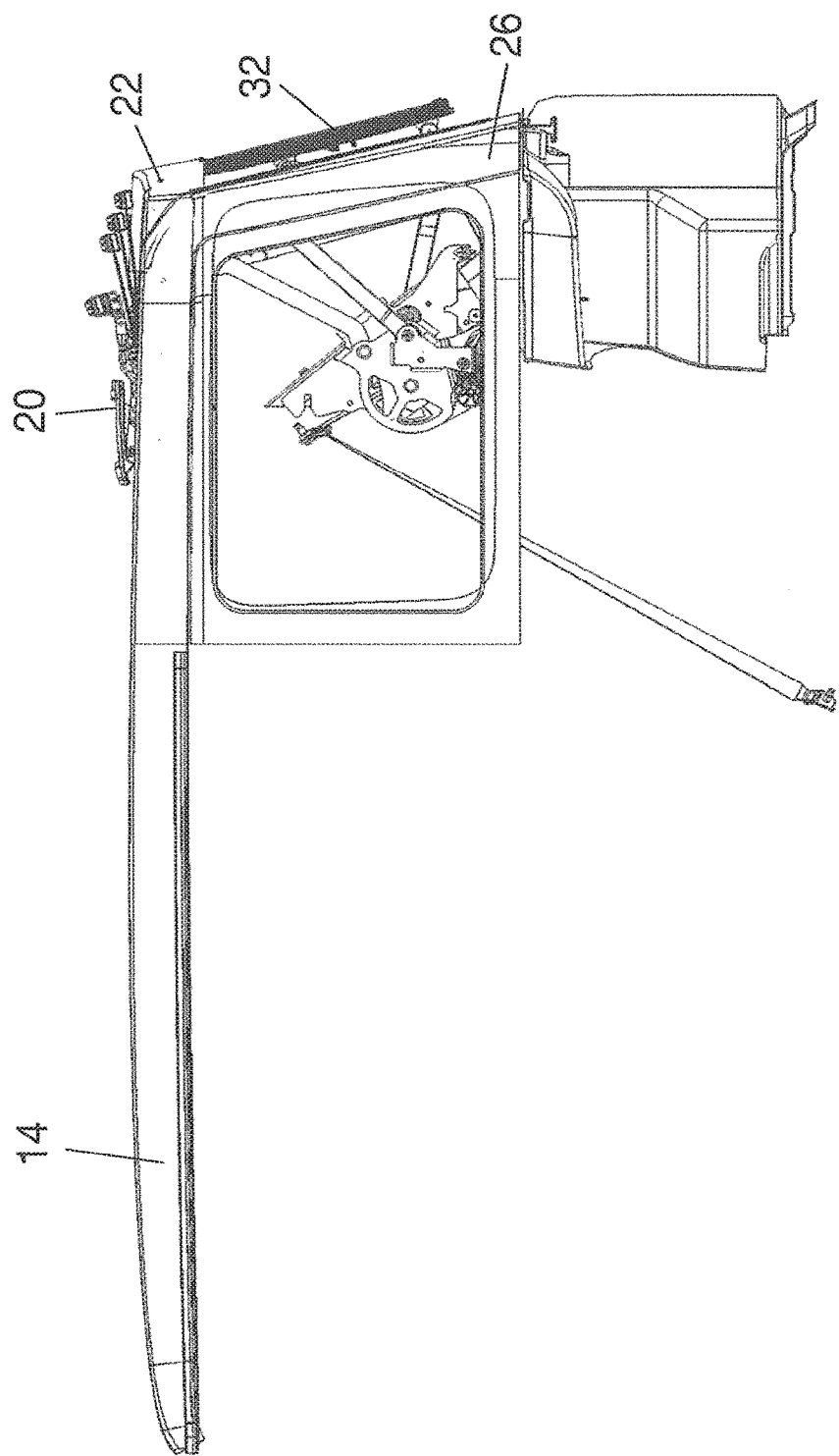
FIG. 3 shows a side view of the construction according to FIG. 2.
Figure 4:
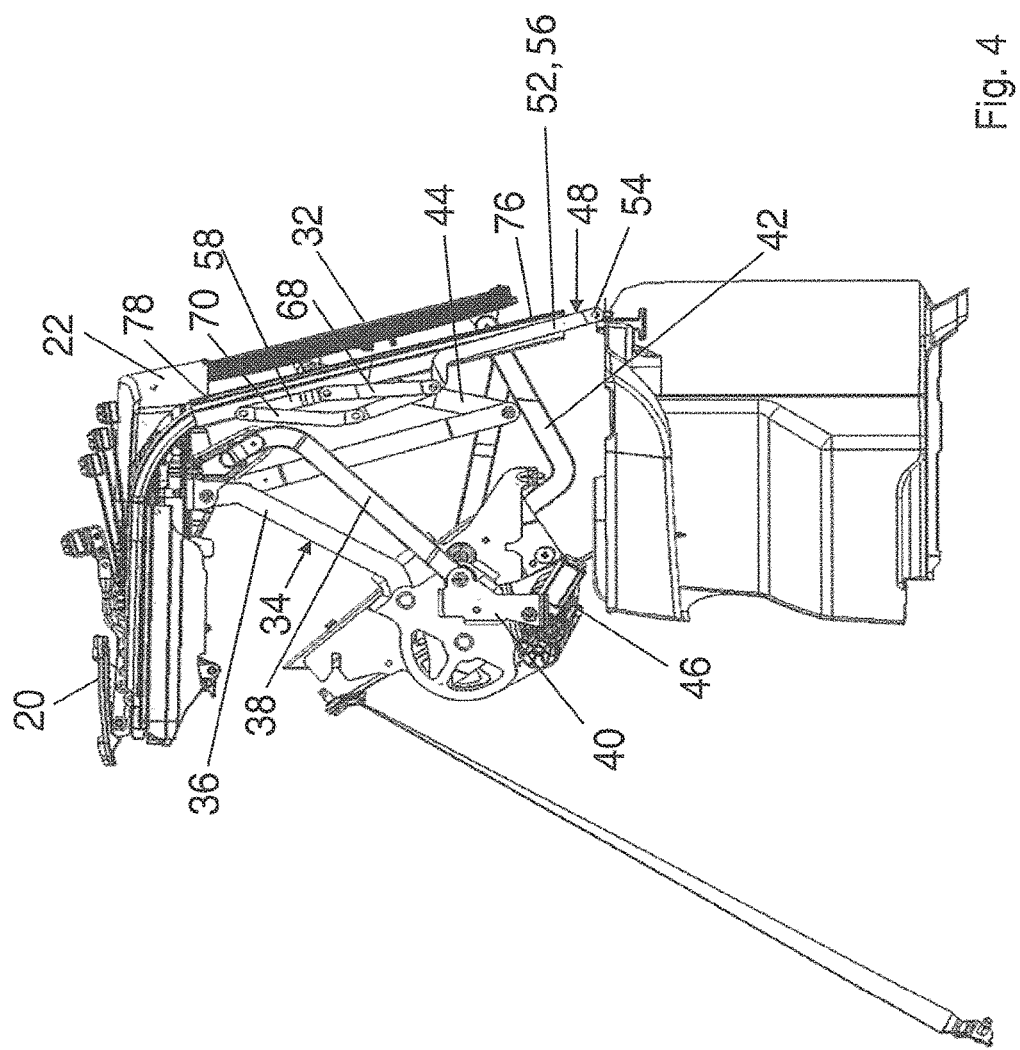
FIG. 4 shows a view corresponding to FIG. 3, but without the lateral roof beam and the D-pillar.
Figure 5:
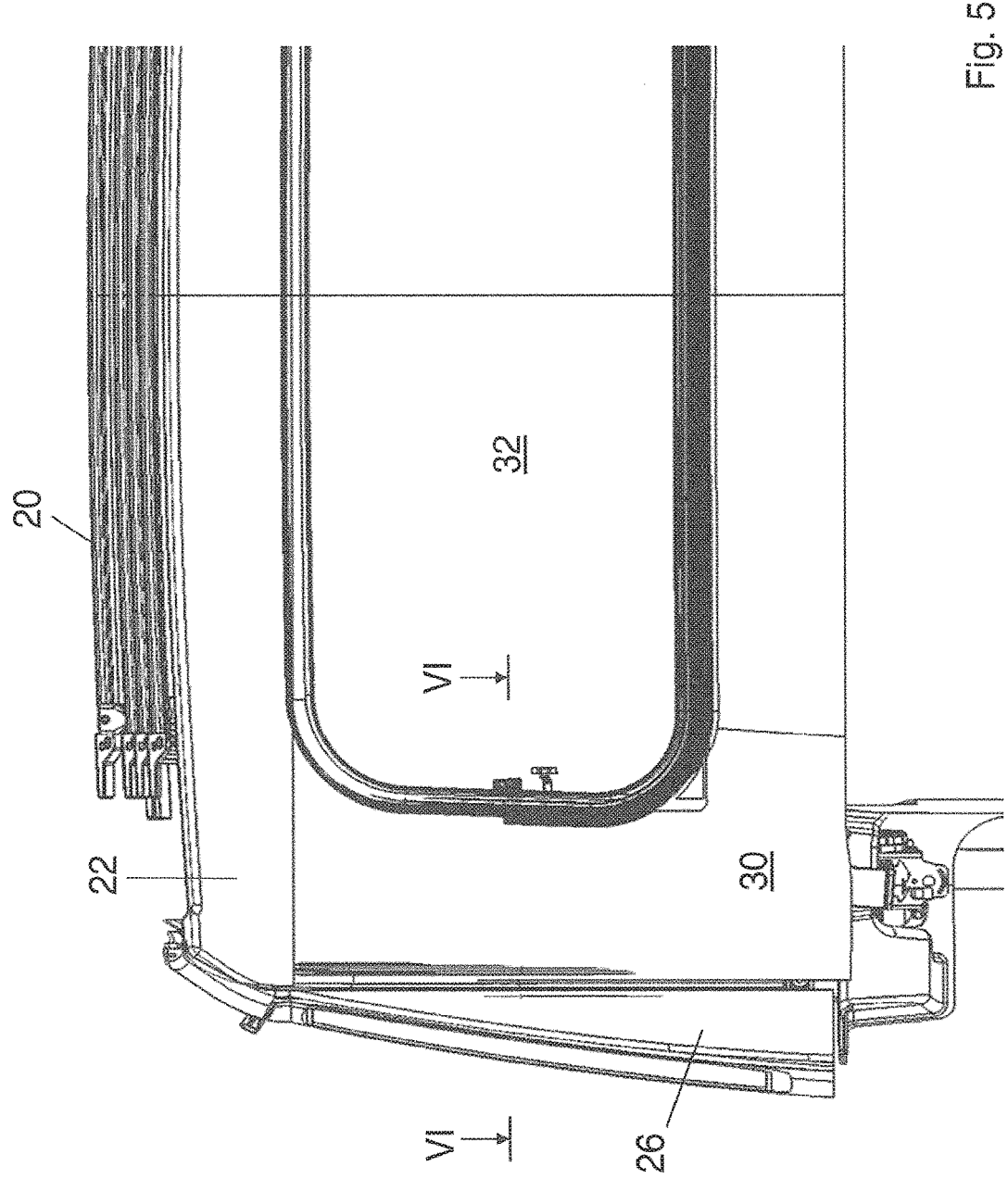
FIG. 5 shows a rear view of the construction according to FIG. 2.
Figure 6:
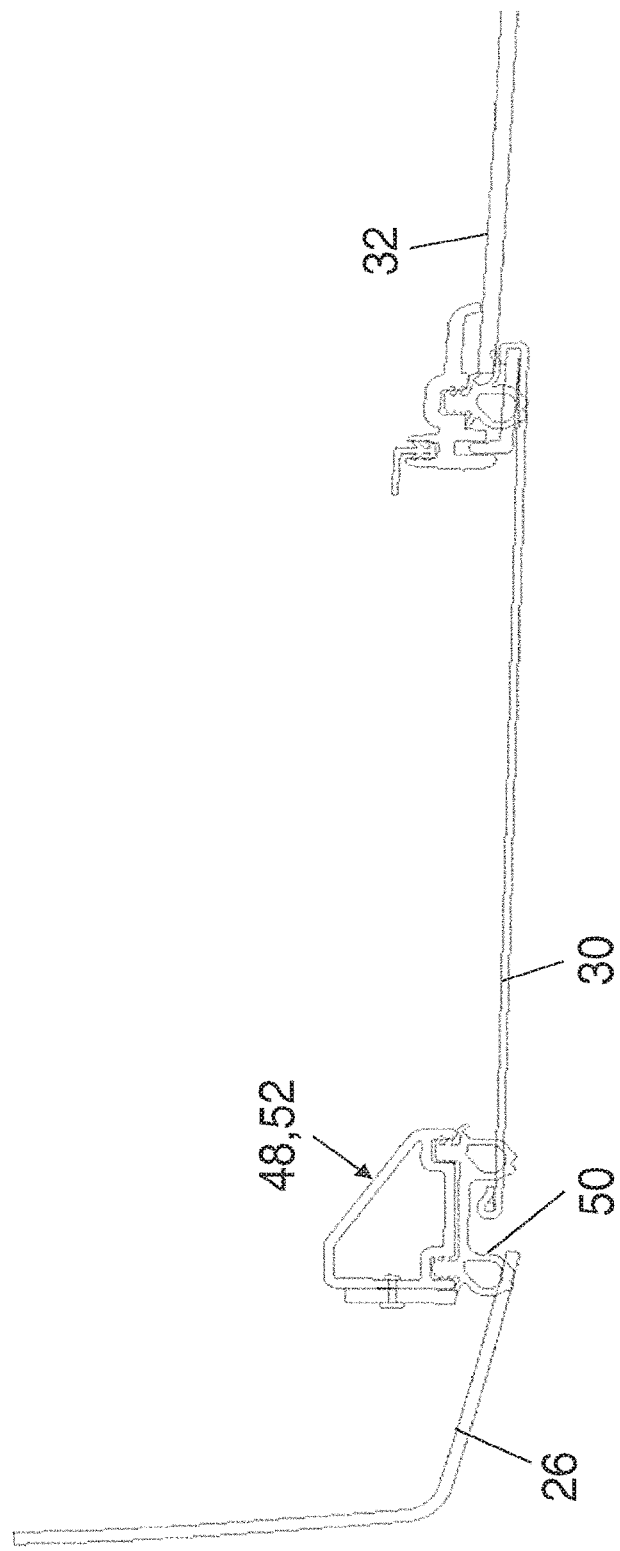
FIG. 6 shows a section through the construction along line VI-VI in FIG. 5.
Figure 7:
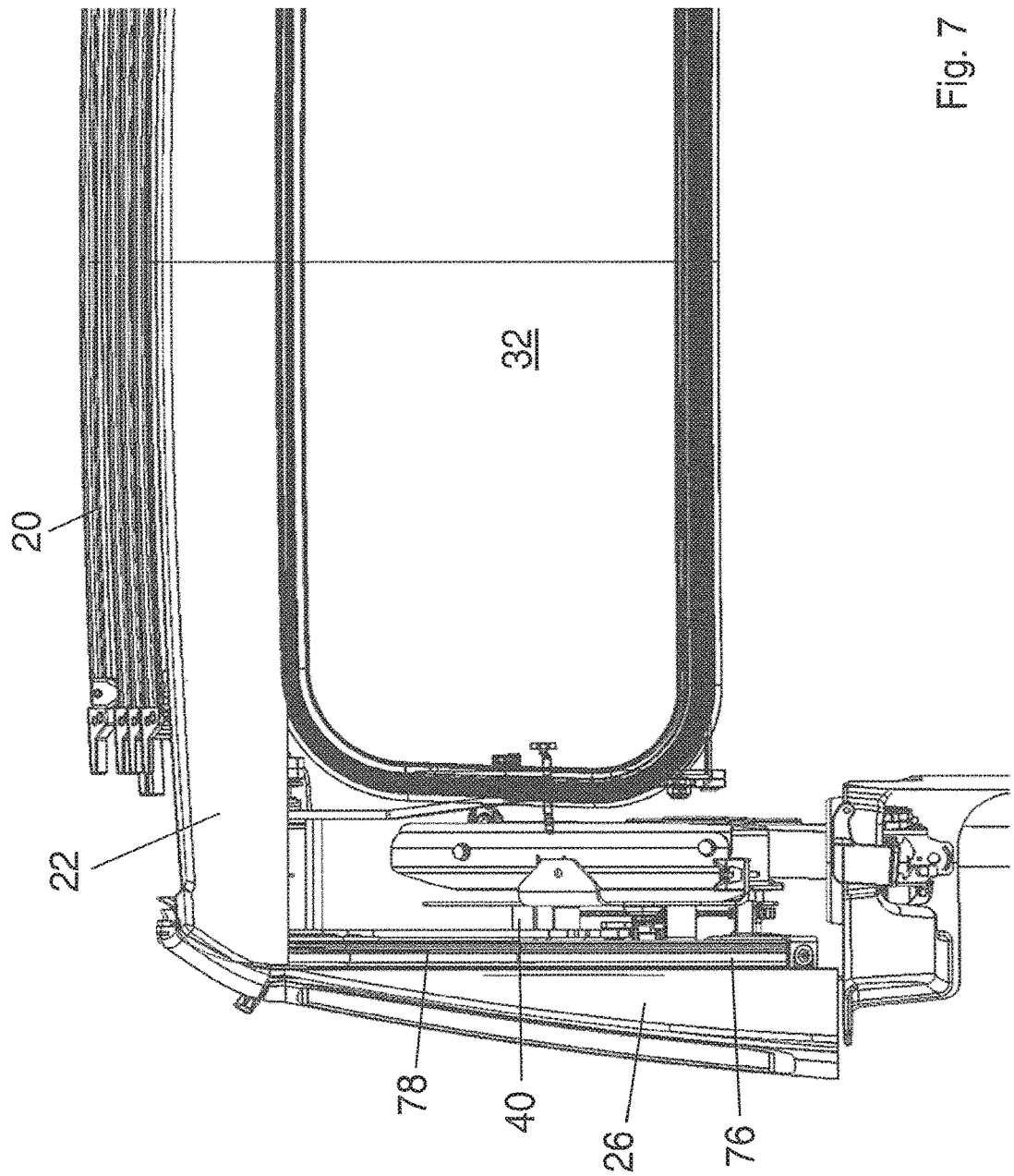
FIG. 7 shows a rear view corresponding to FIG. 5, but without the top fabric.
Figure 8:
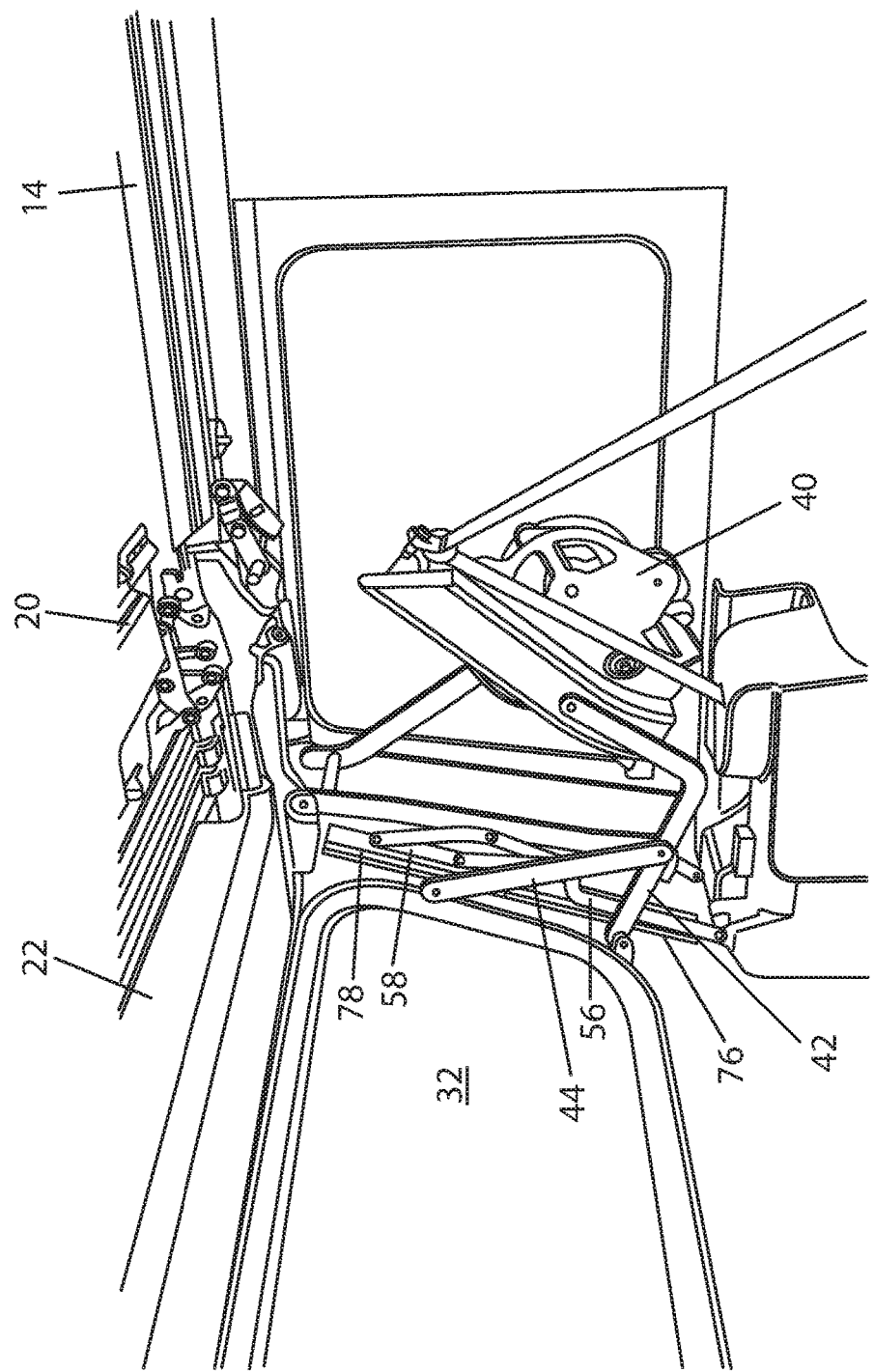
FIG. 8 shows a perspective inside view of the construction according to FIG. 2.
Figure 9:
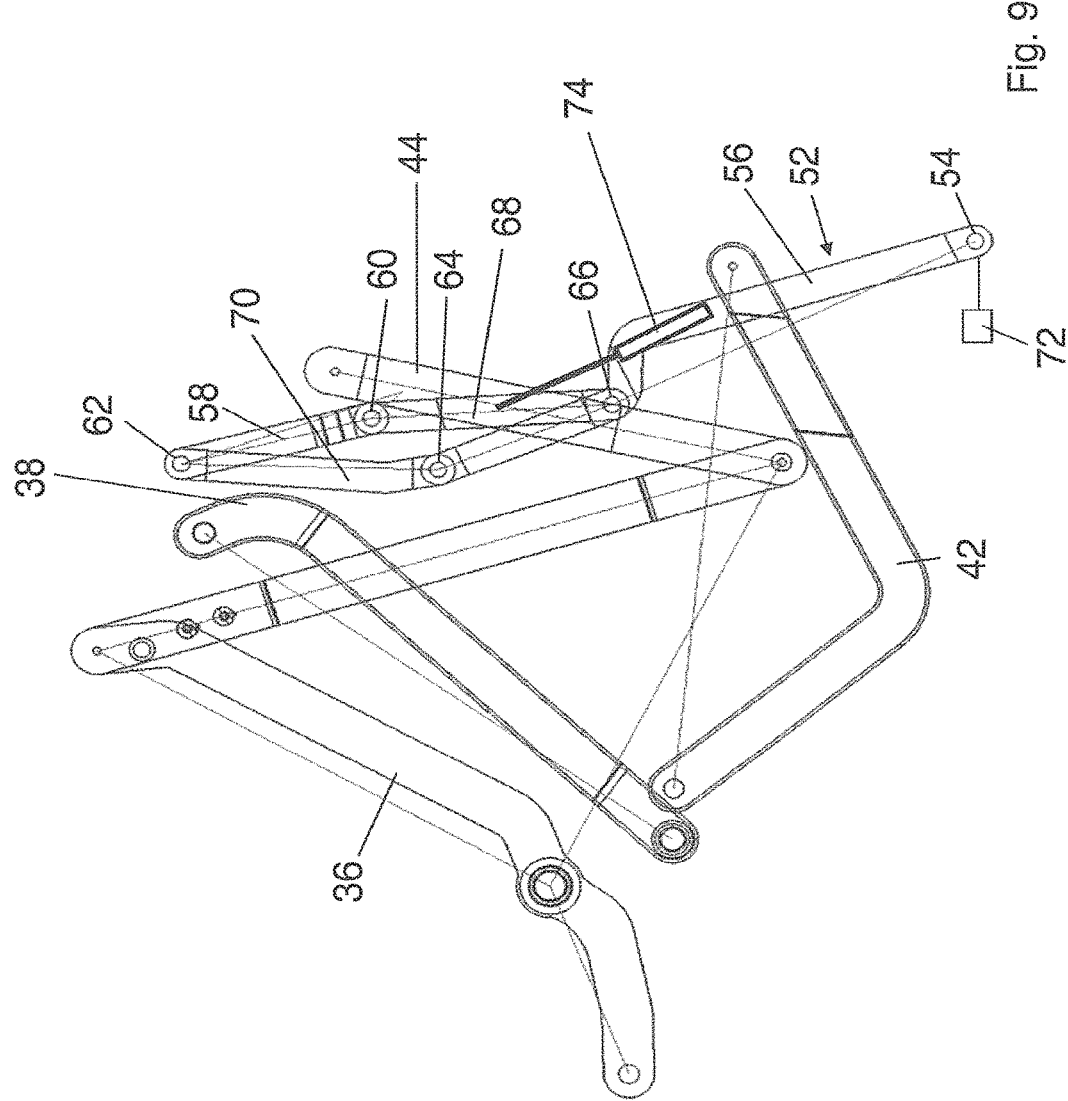
FIG. 9 shows a link arrangement of the top.
Figure 10:
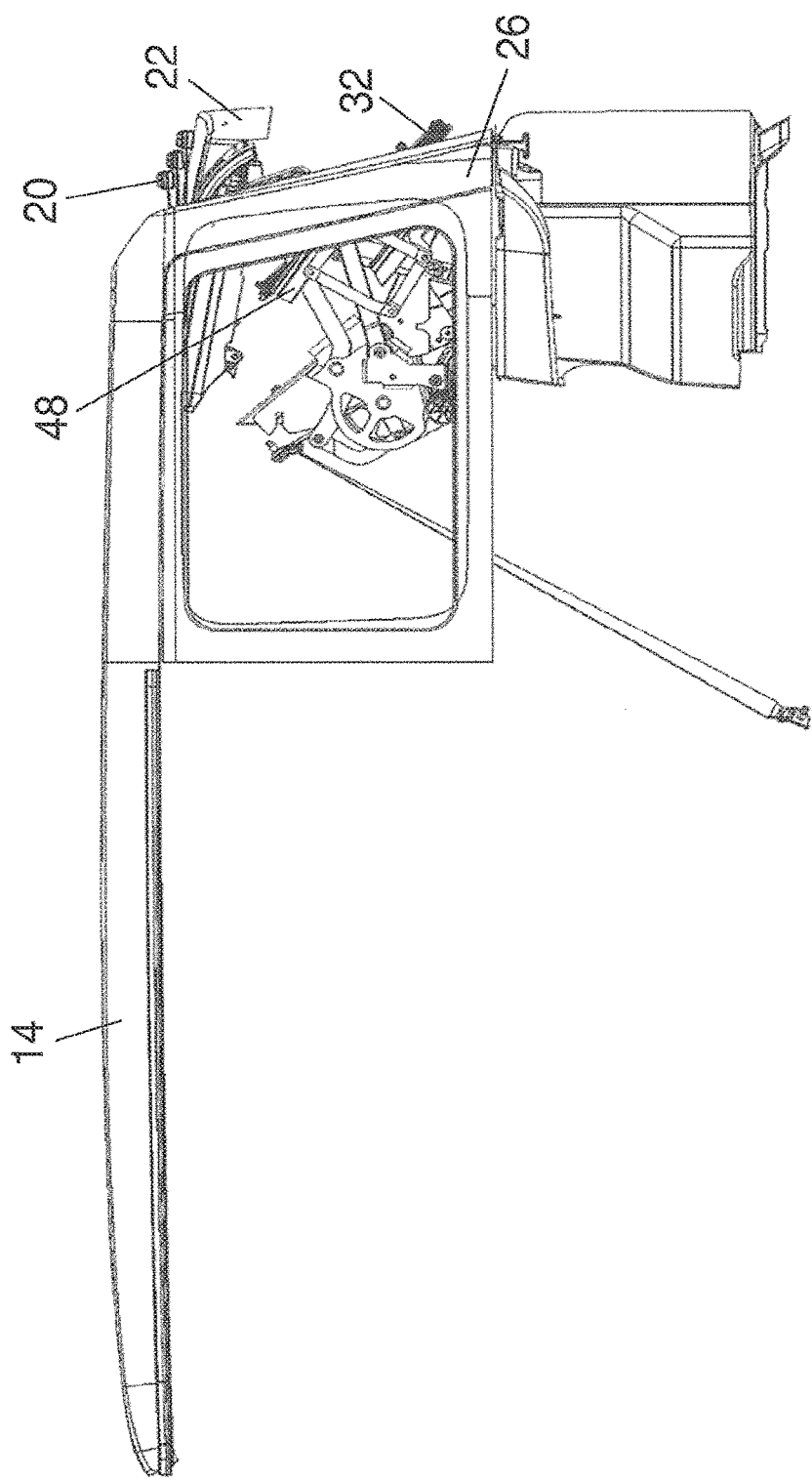
FIG. 10 shows a side view corresponding to FIG. 3, but in an intermediate position of a top cassette.
Figure 11:
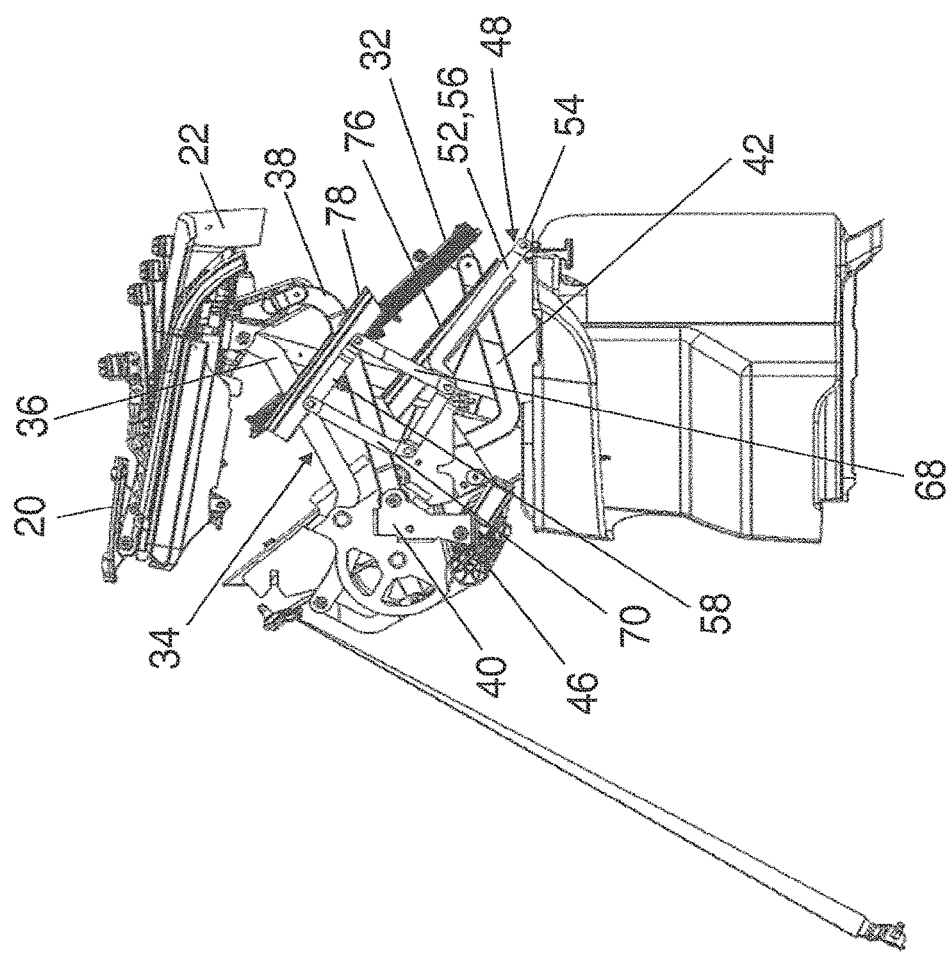
FIG. 11 shows a view corresponding to FIG. 10, but without the lateral roof beam and the D-pillar.
Figure 12:
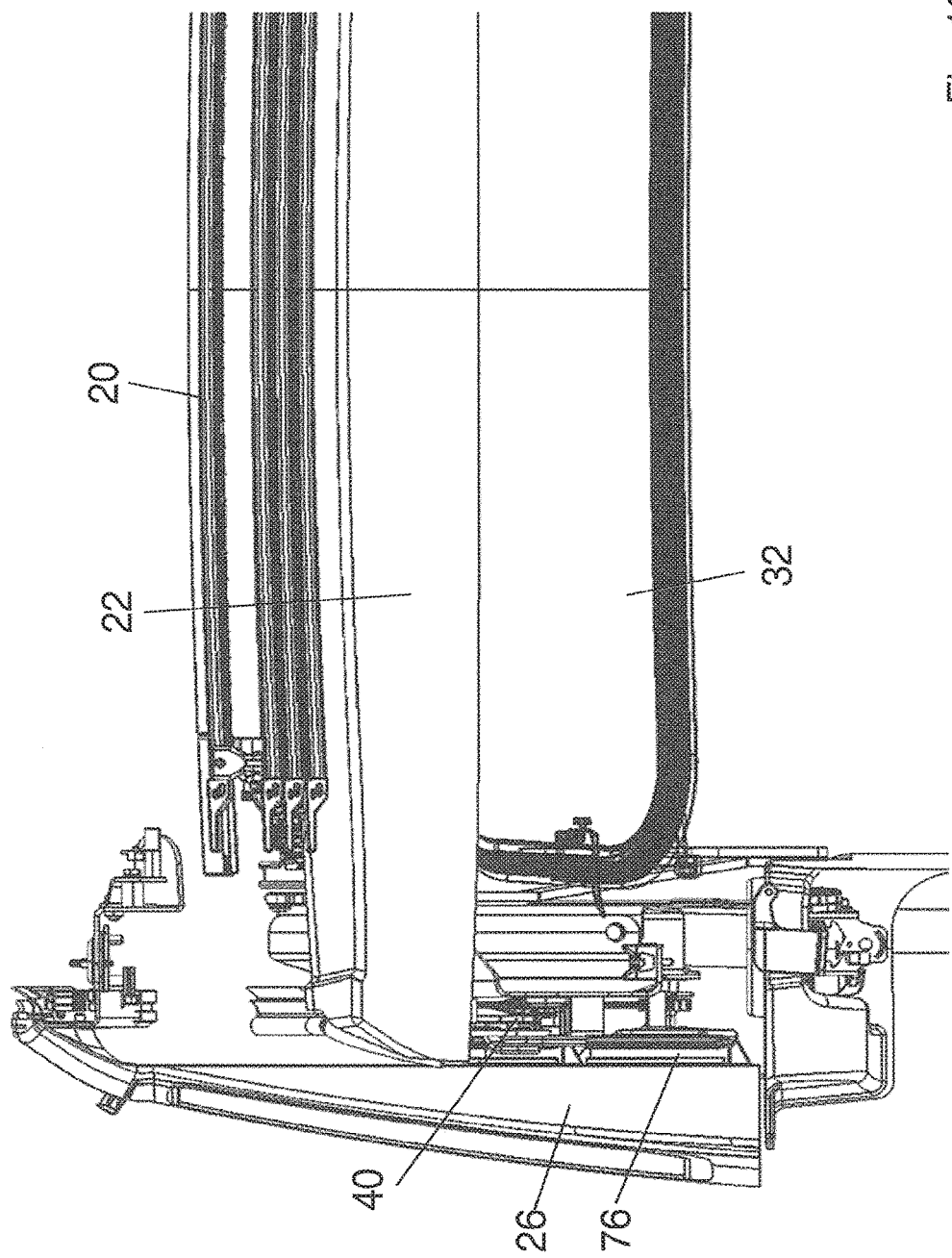
FIG. 12 shows a rear view corresponding to FIG. 7 in the intermediate position of the top cassette.
Figure 13:
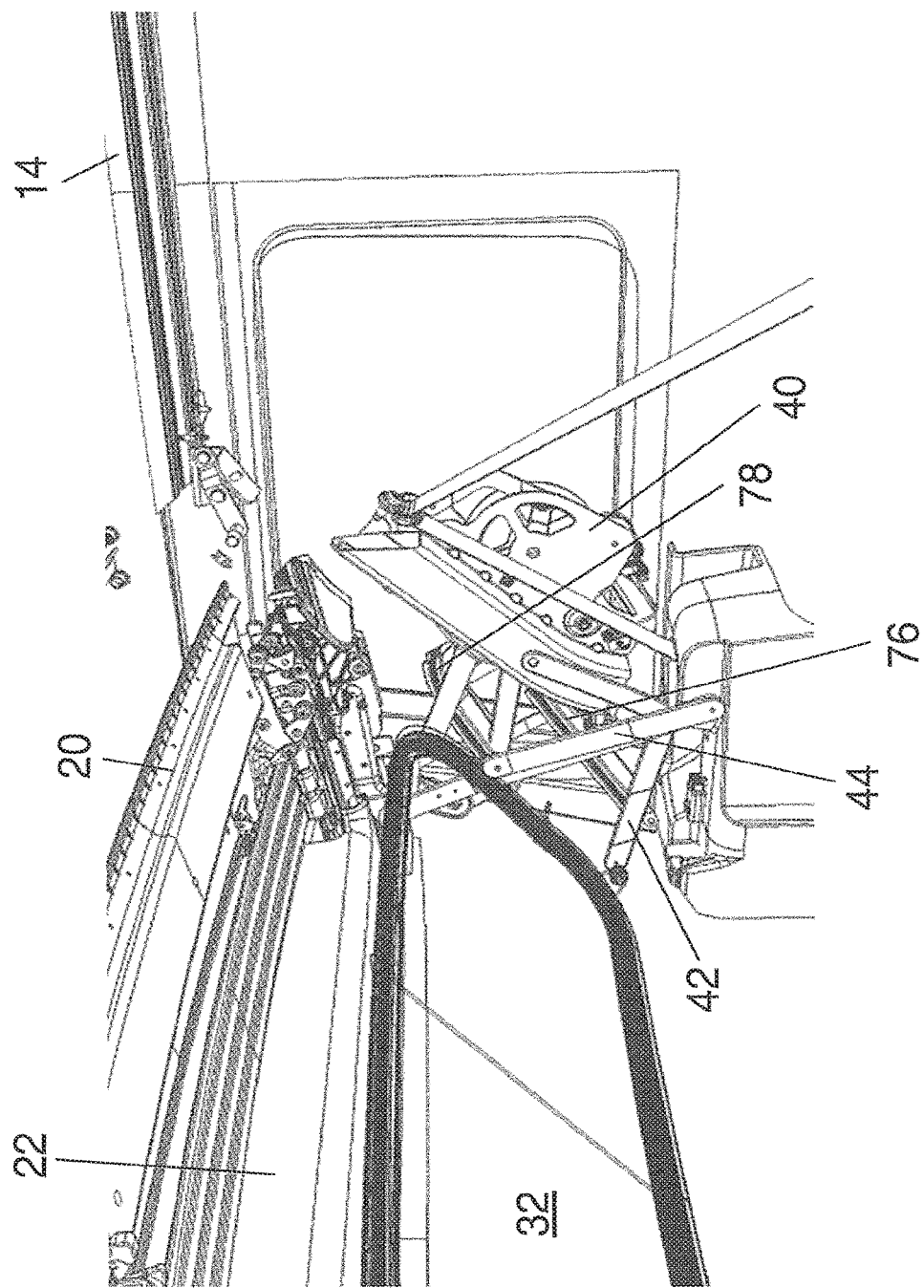
FIG. 13 shows an inside view corresponding to FIG. 8 in the intermediate position of the top cassette.
Figure 14:
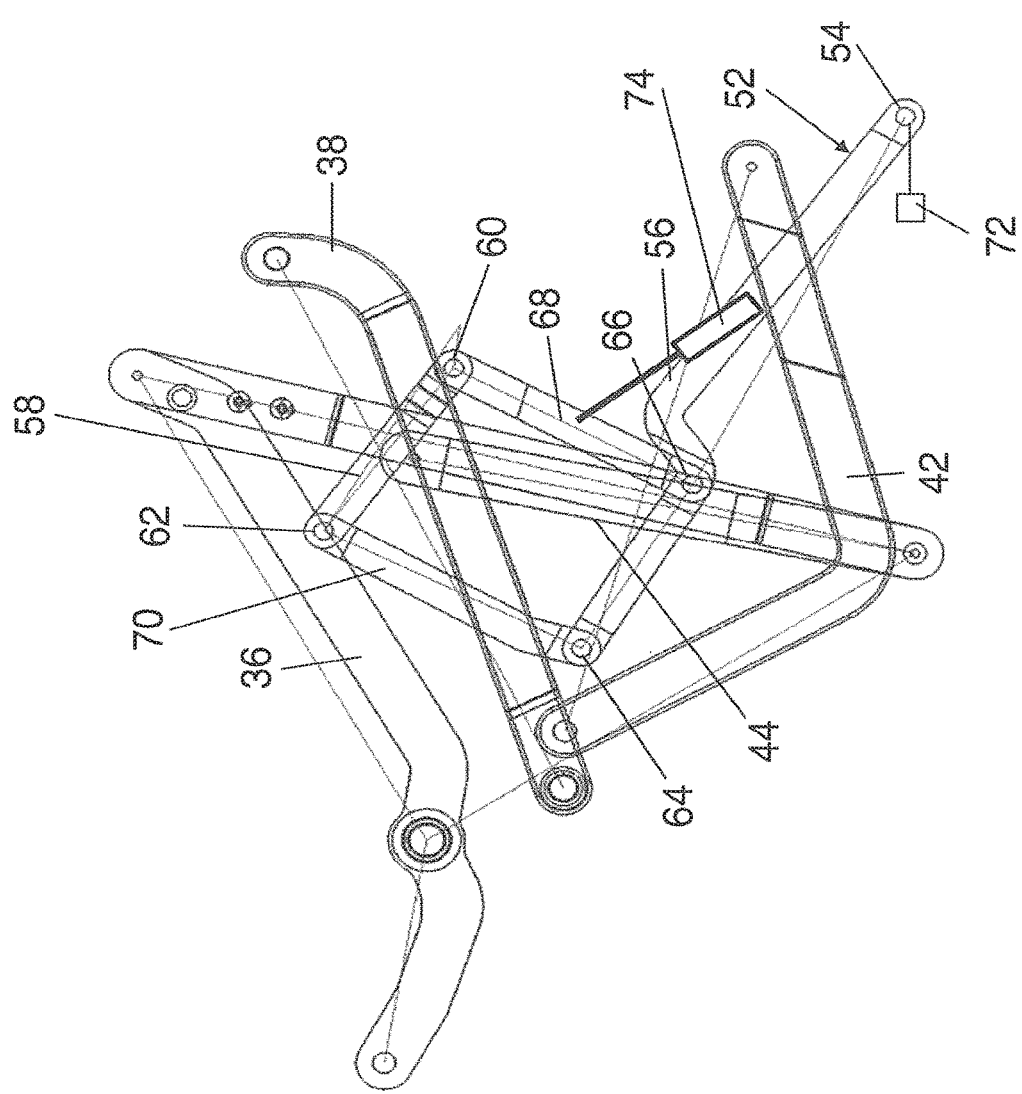
FIG. 14 shows a view of the link arrangement corresponding to FIG. 9, but for the intermediate position of the top cassette.
Figure 15:
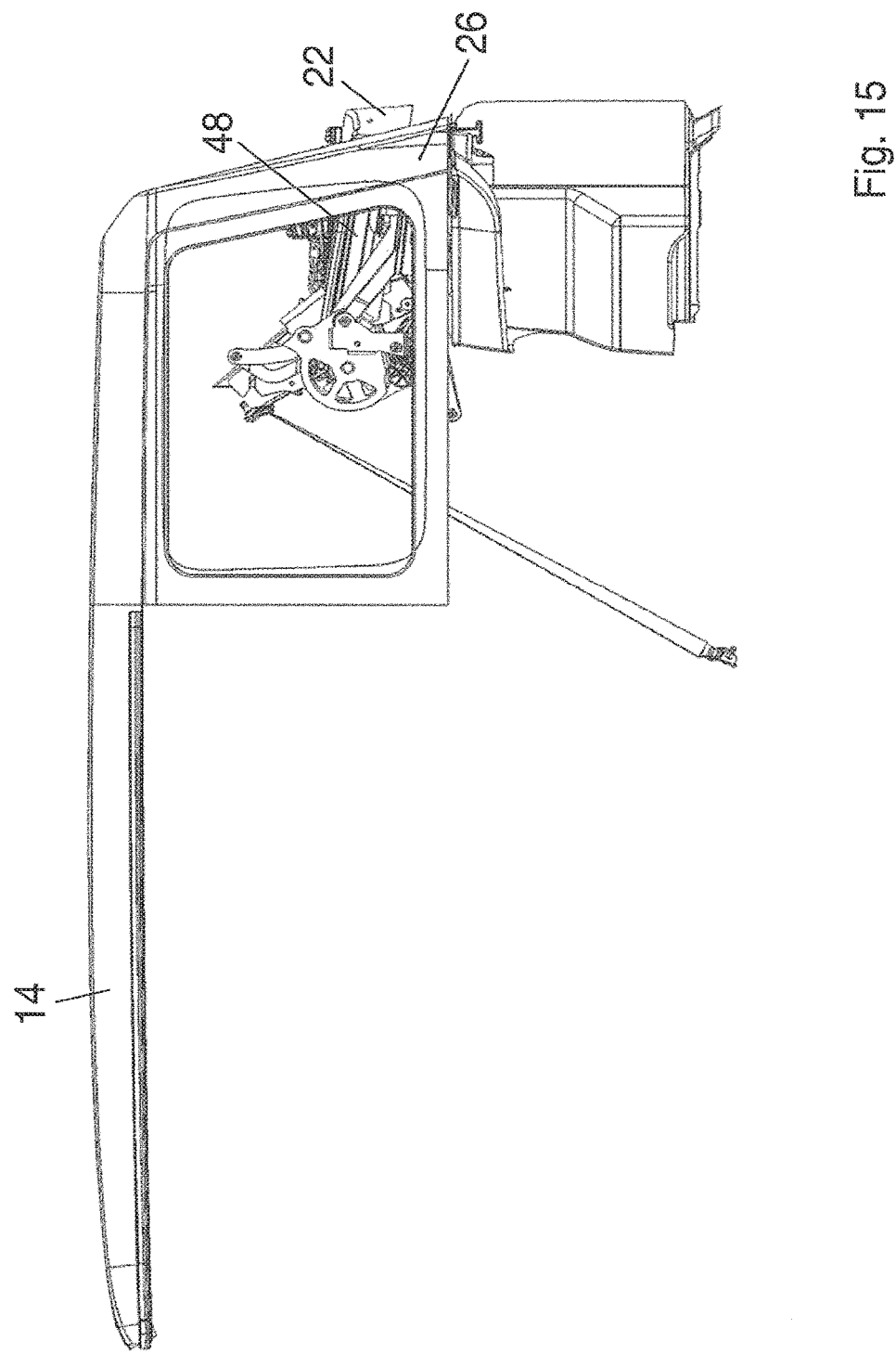
FIG. 15 shows a side view corresponding to FIG. 3, but in the stored state of the top cassette.
Figure 16:
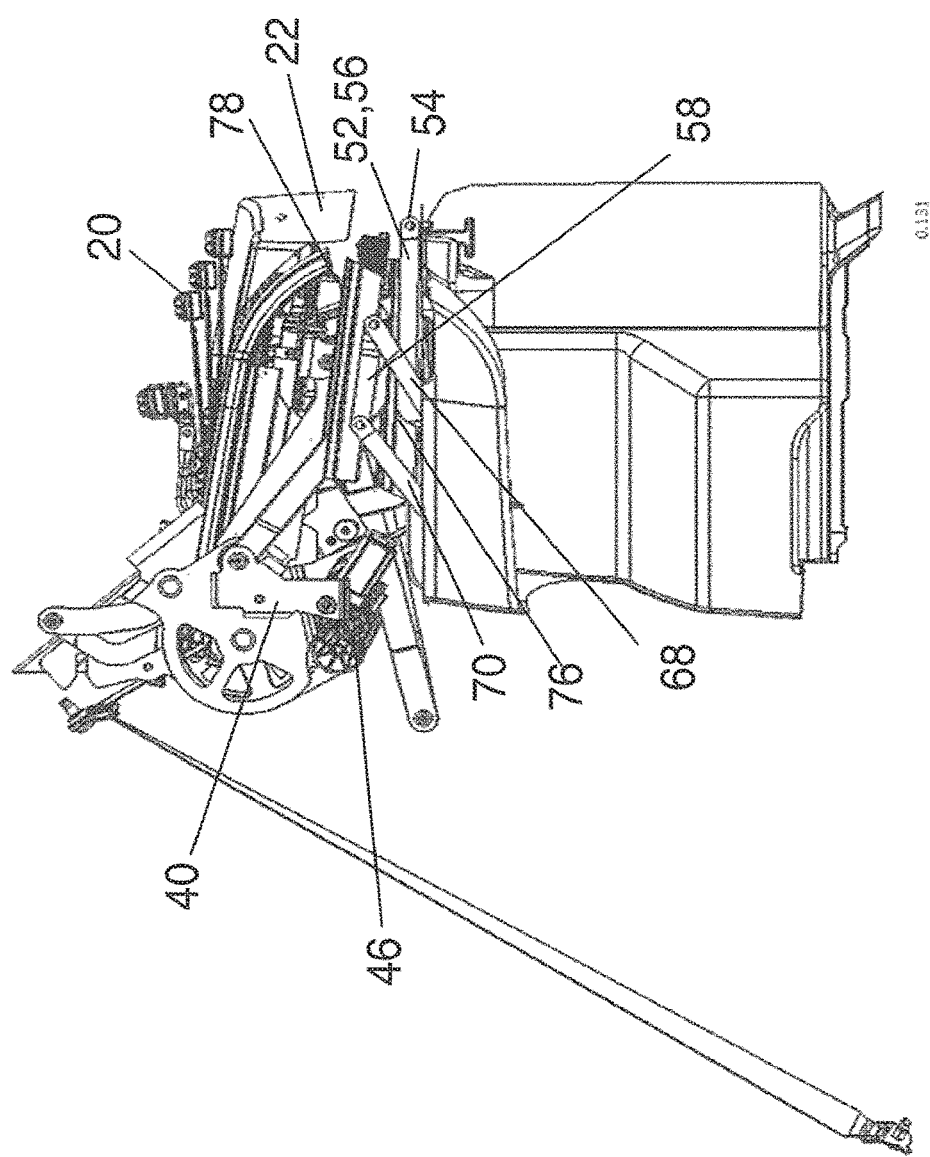
FIG. 16 shows a side view corresponding to FIG. 4, but when the top cassette is stored.
Figure 17:
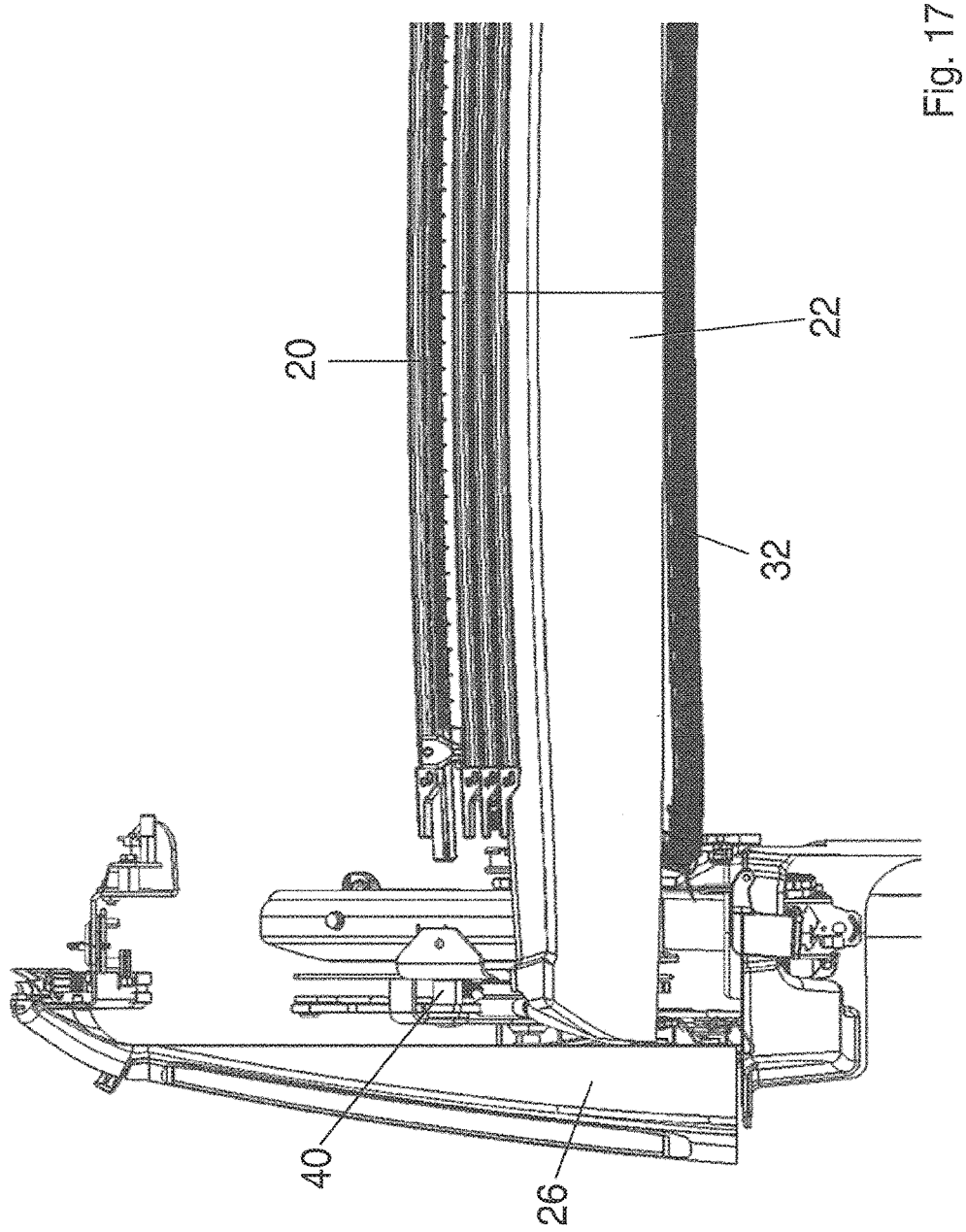
FIG. 17 shows a rear view of the construction corresponding to FIG. 7 when the top cassette is stored.

In a corresponding manner, when displacing the top 18 out of the storage position into the closed position after the top cassette 22 has been lifted into the lifted position being illustrated in FIG. 2, the sealing arrangement 48 is again brought into its sealing position, in which the sealing carrier unit 52 is displaced such that the sealing elements 76 and 78 of the sealing profile 50 are aligned with each other and abut against the inner sides of the fabric cut 30 and of the blind of the D-pillar 26.

LIST OF REFERENCE NUMERALS 10 vehicle construction
12 body
14 longitudinal roof beam
16 roof opening
18 top
20 folding roof portion
22 top cassette
24 rear top portion
26 D-pillar
28 tailgate
30 fabric cut
32 rear window
34 linkage arrangement
36 main link
38 main link
40 main bearing
42 rear window link
44 rear window link
46 main drive
48 sealing arrangement
50 sealing profile
52 sealing carrier unit
54 hinge point
56 carrier link
58 carrier link
60 hinge point
62 hinge point
64 hinge point
66 hinge point
68 control link
70 control link
72 drive
74 drive
76 sealing element
78 sealing element

The invention claimed is:

1. A vehicle construction, comprising:
a top, which is displaceable between a closed position spanning a vehicle interior and a storage position for uncovering the vehicle interior to the top and which includes a linkage that, on each of its two sides, in relation to a vertical longitudinal center plane of the top, comprises one link arrangement, the link arrangement being pivotably mounted at a main bearing that is fixed relative to the vehicle,
wherein a top surface element, in the closed position of the top, abuts against a component part that is fixed relative to the vehicle via a sealing arrangement, and
wherein the sealing arrangement is arranged at a sealing carrier unit, which can be pivoted with respect to the component part that is fixed relative to the vehicle and with respect to the top surface element.

2. The vehicle construction according to claim 1, wherein the sealing carrier unit is pivotably mounted at a basis that is fixed relative to the vehicle.

3. The vehicle construction according to claim 1, wherein the sealing carrier unit is provided with at least one drive apparatus.

4. The vehicle construction according to claim 1, wherein the component part which is fixed relative to the vehicle, and against which the sealing arrangement abuts in the closed position of the top, is a panel, which forms a side surface of the vehicle.

5. The vehicle construction according to claim 1, wherein the sealing arrangement includes at least two sealing elements, which are aligned with one another in a sealing position and which can be pivoted with respect to one another.

6. The vehicle construction according to claim 5, wherein the sealing carrier unit comprises a four-arm hinge arrangement, which includes two carrier links, one of the sealing elements being arranged thereon in each instance.

7. The vehicle construction according to claim 1, wherein the top comprises a rear top cassette, which forms a rear roof region in the closed position of the top and can be lowered, using the linkage, into the storage position for displacing the top.

8. The vehicle construction according to claim 7, wherein the sealing arrangement can be pivoted out of a movement track thereof.

9. The vehicle construction according to claim 7, wherein a folding roof portion of the top is arranged at the top cassette.

10. The vehicle construction according to claim 9, wherein the folding roof portion, when the top cassette is being lowered, is accommodated by the same.

* * * * *